(12) United States Patent
van Aken

(10) Patent No.: US 9,879,906 B2
(45) Date of Patent: Jan. 30, 2018

(54) METHOD OF COOLING AND LIQUEFYING A HYDROCARBON STREAM, AN APPARATUS THEREFOR, AND A FLOATING STRUCTURE, CAISSON OR OFF-SHORE PLATFORM COMPRISING SUCH AN APPARATUS

(76) Inventor: Michiel Gijsbert van Aken, The Hague (NL)

(*) Notice: Subject to any disclaimer, the term of this patent is extended or adjusted under 35 U.S.C. 154(b) by 1886 days.

(21) Appl. No.: 12/993,257

(22) PCT Filed: May 18, 2009

(86) PCT No.: PCT/EP2009/055967
§ 371 (c)(1),
(2), (4) Date: Nov. 18, 2010

(87) PCT Pub. No.: WO2009/141293
PCT Pub. Date: Nov. 26, 2009

(65) Prior Publication Data
US 2011/0067440 A1    Mar. 24, 2011

(30) Foreign Application Priority Data

May 20, 2008    (EP) ..................................... 08156521

(51) Int. Cl.
*F25J 1/02*    (2006.01)
*B63B 35/44*    (2006.01)
*F25J 1/00*    (2006.01)

(52) U.S. Cl.
CPC ............... *F25J 1/023* (2013.01); *B63B 35/44* (2013.01); *F25J 1/0022* (2013.01); *F25J 1/0055* (2013.01);
(Continued)

(58) Field of Classification Search
CPC .............................. F25J 1/0022; F25J 1/0055
(Continued)

(56) References Cited

U.S. PATENT DOCUMENTS 3,729,945 A * 5/1973 Linnett ........................... 62/612
3,885,394 A   5/1975 Witt et al. ....................... 60/651
(Continued)

FOREIGN PATENT DOCUMENTS

DE    3200958    7/1983 ............. B63B 27/34
JP    2007092640  4/2007 ............. F01M 1/02
(Continued)

OTHER PUBLICATIONS

KR100812723B1, English translation.*
(Continued)

*Primary Examiner* — Frantz Jules
*Assistant Examiner* — Brian King

(57) ABSTRACT

A method and apparatus for cooling and liquefying a hydrocarbon stream using a liquefaction process wherein a hydrocarbon stream is cooled and at least partially liquefied to obtain a liquefied hydrocarbon stream. In the method, one or more compressors are driven with one or more electric drivers, that are powered with one or more dual-fuel diesel-electric generators. These dual-fuel diesel-electric generations are operated by passing one or more hydrocarbon fuel streams to the one or more dual-fuel diesel-electric generators, wherein at least one of the one or more hydrocarbon fuel streams comprises a stream that is generated in the liquefaction process. The apparatus may be provided on a floating structure, a caisson, or off-shore platform.

19 Claims, 4 Drawing Sheets

(52) U.S. Cl.
CPC .......... *F25J 1/0212* (2013.01); *F25J 1/0278* (2013.01); *F25J 1/0284* (2013.01); *F25J 1/0292* (2013.01); *F25J 1/0298* (2013.01); *B63B 2035/4473* (2013.01); *F25J 2210/06* (2013.01); *F25J 2220/62* (2013.01); *F25J 2230/22* (2013.01); *F25J 2230/32* (2013.01); *F25J 2230/60* (2013.01); *F25J 2245/90* (2013.01); *F25J 2290/62* (2013.01); *Y02T 10/36* (2013.01)

(58) Field of Classification Search
USPC ............ 62/611, 612, 613, 636, 53.2; 25/611
See application file for complete search history.

(56) References Cited

U.S. PATENT DOCUMENTS

| | | | | |
|---|---|---|---|---|
| 3,944,400 | A | * | 3/1976 | Bird .................................. 95/11 |
| 4,417,878 | A | | 11/1983 | Koren ............................... 440/3 |
| 5,729,985 | A | * | 3/1998 | Yoshihara et al. ................. 62/81 |
| 5,755,114 | A | * | 5/1998 | Foglietta .......................... 62/618 |
| 7,114,351 | B2 | * | 10/2006 | Jones et al. ..................... 62/611 |
| 8,616,021 | B2 | * | 12/2013 | Minta ............................. 62/613 |
| 2007/0009369 | A1 | | 1/2007 | Dany ............................ 417/323 |
| 2007/0130991 | A1 | * | 6/2007 | Shipchandler et al. ........ 62/613 |
| 2009/0217701 | A1 | * | 9/2009 | Minta et al. .................... 62/612 |

FOREIGN PATENT DOCUMENTS

| | | | | |
|---|---|---|---|---|
| KR | 20090067283 | | 12/2007 | ............. F17C 7/00 |
| KR | 100812723 | B1 * | 3/2008 | |
| SU | 1059234 | | 12/1983 | ............. F02B 37/12 |
| WO | WO2005108770 | | 11/2005 | |
| WO | WO200652392 | | 5/2006 | |
| WO | WO200711155 | | 1/2007 | ............. C10G 5/00 |
| WO | 2007021351 | A1 | 2/2007 | |
| WO | WO2009063092 | | 5/2009 | |

OTHER PUBLICATIONS

Persaud et al: Safety drivers in the lay-out of floating LNG plantsl, $3^{rd}$ topical conference on Natural Gas Utilization, AlChE Publ. No. 176, pp. 359-372 (2003).

LNG Focus magazine of Feb. 2007.

"Guide for Propulsion systems for LNG Carrier," Houston, pp. 1-5, American Bureau of Shipping.

Wadahl Anders & Christiansen Per: "LNG FPSO Based on Spherical Tanks", Annual Offshore Technology Conference, No. 14095, May 6, 2002, pp. 1-10.

* cited by examiner

METHOD OF COOLING AND LIQUEFYING A HYDROCARBON STREAM, AN APPARATUS THEREFOR, AND A FLOATING STRUCTURE, CAISSON OR OFF-SHORE PLATFORM COMPRISING SUCH AN APPARATUS

PRIORITY CLAIM

The present application is a national stage entry of PCT Application EP2009/055967, filed 18 May 2009, which claims priority to European Patent Application No. EP 08156521.0, filed 20 May 2008, which are incorporated herein by reference.

TECHNICAL FIELD OF THE INVENTION

The present invention relates to a method of cooling a hydrocarbon stream, and an apparatus therefore, and a floating structure, caisson, or off-shore platform comprising such an apparatus. The hydrocarbon stream may particularly but not exclusively be natural gas.

BACKGROUND OF THE INVENTION

Several methods for cooling and liquefying a natural gas stream to provide liquefied natural gas (LNG) are known. It is desirable to liquefy natural gas for a number of reasons. As an example, natural gas can be stored and transported over long distances more readily as a liquid than in gaseous form because it occupies a smaller volume and does not need to be stored at high pressure.

In certain situations, particularly those where an off-shore natural gas field is located a significant distance from land, the cost of construction of an under-sea pipeline to a land-based liquefaction facility can render the extraction of natural gas from an off-shore field uneconomic. Floating Liquefied Natural Gas (FLNG) facilities have the potential to offer an economically viable solution to this problem by treating and liquefying the natural gas on an off-shore floating facility and supplying the LNG product directly to LNG tankers, thereby avoiding the costs involved in constructing a long under-sea pipeline. Large scale off-shore facilities for the liquefaction of natural gas may use direct-drive gas turbines to power the refrigerant compressors. Such gas turbines can pose a safety hazard, and placing the gas turbines adjacent to the LNG tanks should preferably be avoided.

"Safety drivers in the lay-out of floating LNG plants", Third Topical Conference on Natural Gas Utilisation, AIChE Pub. No. 176, pp. 359-372 (2003) by Persaud et al, discloses that gas turbine blade and rotor failures are high energy events with the potential to penetrate the FLNG double deck and cause a fire in the cryogenic storage tanks in a worst-case scenario. For this reason, the authors recommend keeping the gas turbines away from cryogenic storage tanks.

However, when providing a FLNG facility, it is necessary to fit the liquefaction equipment into a much smaller footprint than would normally be available on-shore. For example, a FLNG facility may be restricted to about one-quarter of the size of an equivalent on-shore facility. It is therefore not a simple matter to locate the gas turbines sufficiently far away from the cryogenic storage tanks to satisfy safety considerations.

There is thus a drive in the industry to remove the need for using a gas turbine for driving a compressor.

WO 2006/052392 discloses a liquefaction facility on a liquefied natural gas transportation vessel, wherein natural gas is refrigerated by a refrigerant until it is condensed into a substantially liquid phase. In this process, the refrigerant is compressed in a compressor. Power is provided to the compressor by a power generator in the form of an engine. The engine may be gas powered, with the gas being provided from either naturally-occurring boil-off of natural gas from the LNG stored in the containment structure, or from an independent fuel supply. Alternatively, the engine may be diesel powered. The power generator drives a motor, which in turn provides mechanical power to the compressor.

SUMMARY OF THE INVENTION

In a first aspect, the present invention provides a method of cooling and liquefying a hydrocarbon stream comprising at least the steps of:
(i) providing one or more compressors;
(ii) driving the one or more compressors with one or more electric drivers;
(iii) powering the one or more electric drivers with the one or more dual-fuel diesel-electric generators;
(iv) passing one or more hydrocarbon fuel streams to one or more dual-fuel diesel-electric generators;
(v) operating a liquefaction process comprising providing a hydrocarbon stream, and cooling and at least partially liquefying the hydrocarbon stream to obtain a liquefied hydrocarbon stream;
wherein at least one of the one or more hydrocarbon fuel streams comprises a stream that is generated in the liquefaction process.

In another aspect, the present invention provides an apparatus for cooling and liquefying a hydrocarbon stream at least comprising:
 at least one compressor;
 an electric driver coupled with the least one compressor;
 one or more dual-fuel diesel-electric generators arranged to provide electric power to the one or more electric drivers, said one or more dual-fuel diesel-electric generators being operable using one or more hydrocarbon fuel streams; and
 a liquefaction plant comprising:
  a source for providing a hydrocarbon stream;
  one or more heat exchangers for cooling and at least partially liquefying the hydrocarbon stream to obtain a liquefied hydrocarbon stream;
wherein at least one of the one or more hydrocarbon fuel streams comprises a stream generated in the liquefaction plant.

In still other aspects, the invention provides a floating structure, caisson or off-shore platform, comprising such an apparatus.

BRIEF DESCRIPTION OF THE DRAWINGS

Embodiments of the present invention will now be described by way of example only, and with reference to the accompanying non-limiting drawings in which.

DETAILED DESCRIPTION OF THE PREFERRED EMBODIMENTS

Figure 1:
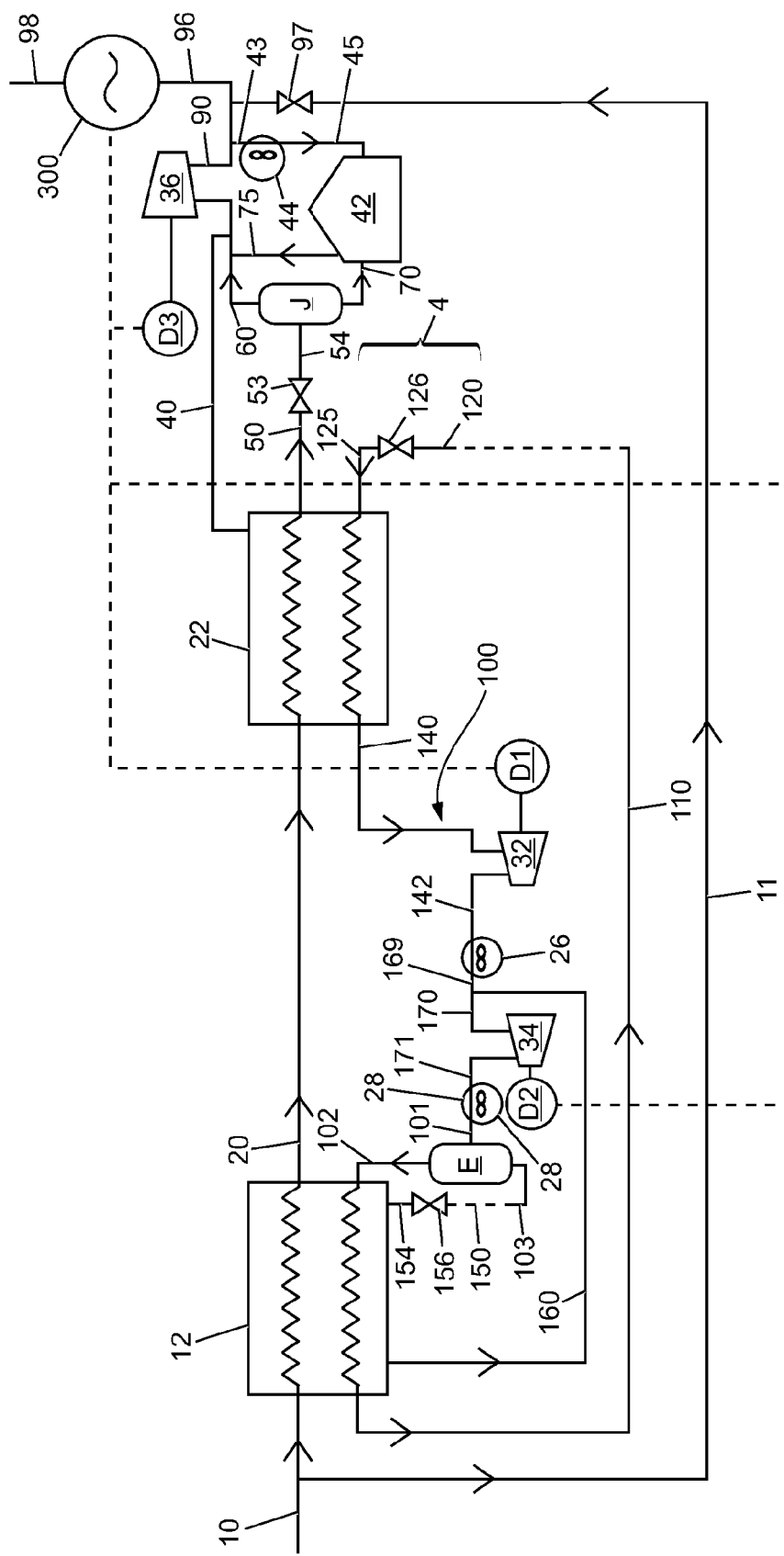
FIG. 1 is a diagrammatic scheme including a hydrocarbon liquefying process and showing an embodiment of the present invention.

Described are methods of operating a compressor in a facility for cooling a hydrocarbon stream. This patent application describes the use of a dual-fuel diesel-electric (DFDE) generator to supply electricity to an electric driver of a compressor. The use of such DFDE generators allow for further saving of space otherwise needed for equipment.

An advantage of the described methods and apparatuses for cooling and liquefying a hydrocarbon stream is that they need less space for equipment.

The invention is based on an insight that a DFDE generator is capable of incinerating a wide variety of hydrocarbon-containing streams that are generated in a liquefaction process. This can be advantageously made use of, to save on the need for special equipment to handle and/or store such hydrocarbon streams.

DFDE generators may run on various gaseous hydrocarbon fuel streams, even those with greater than 30 mol % nitrogen. DFDE generators can operate with relatively low-pressure fuel, at a pressure of about 5 or 6 bar, dispensing with or reducing compression requirements for the fuel stream. It is now proposed to use this capability to handle streams generated in the liquefaction process.

An end-flash gas stream is typically a low pressure stream hydrocarbon containing stream that contains high nitrogen, which is generally not pure enough to vent to air directly. This makes end-flash gas a specifically preferred hydrocarbon fuel source for a DFDE generator.

Another preferred hydrocarbon fuel source is formed by a refrigerant bleed stream, particularly a multicomponent refrigerant bleed stream. Bleed streams may be generated particularly in mixed refrigerant processes in the course of optimizing the refrigerant composition. Bleed streams are often drawn from a refrigerant circuit at a low-pressure area in the cycle. A refrigerant bleed stream may contain alkanes such as ethanes, that are not suitable for fuelling a gas turbine. By adding a refrigerant bleed stream to the hydrocarbon fuel stream for the DFDE generator, the composition does not need to be guarded and at the same time no special additional equipment is needed to handle and/or store the bleed stream. Thus equipment space is saved. Preferred are bleed streams from a closed refrigerant cycle, as opposed to open or semi-open cycles.

DFDE generators comprise a reciprocating engine. These reciprocating engines can also operate with heavy fuel oil or marine diesel oil, and can have the versatility to switch between different fuels during operation. Combustion is triggered by the injection of a small amount of pilot diesel oil just after the compression stage. DFDE generators provide an output of 1 MW per cylinder, with the largest engine having 18 cylinders and producing 18 MW.

DFDE generators have efficiencies, including electrical loss in power generation, in excess of 45% and in combination with electric drivers represent a viable alternative to conventional gas turbine drivers for compressors. In addition, DFDE generators can be placed in the engine room of a floating structure, such as a vessel. By placing the DFDE generators in the engine room of a vessel, which is already built to protect the equipment from weather and the sea, and is located in a separate space away from other (re-)liquefaction equipment, improves the reliability and safety of the facility. This also allows maintenance of the DFDE generators to be carried out in the controlled environment of the engine room, compared to the deck of a vessel.

In addition, DFDE generators are relatively simple and robust machines, only showing de-rating (power-reduction) at temperatures above 40° C.

Standard vessels would have space for five 16 MW DFDE generators, which can be used to provide power for a single string liquefaction train of <2 MTPA, for instance when a single 80 MW electric driver is used. This can be compared with the significantly larger deck space consumed by conventional two-compressor strings which use 40 MW aero-derivative gas turbines.

Therefore, preferably the compressor is exclusively driven by the electric driver, thereby avoiding the need for providing a gas turbine for the purpose of driving the compressor.

Where for instance the compressor is used in a hydrocarbon stream liquefaction plant or process, the dual-fuel diesel-electric generator may advantageously be fuelled by a hydrocarbon fuel stream comprising one or more of the group selected from: refrigerant bleed gas, end-flash gas and feed gas. Such streams are often available (e.g. employed or generated) in such a liquefaction plant or process.

For the purpose of the present specification, the liquefaction process is considered to start with providing the hydrocarbon feed stream to be liquefied, and end where the liquefied hydrocarbon is sent to storage. A liquefaction plant is defined as the equipment directly related to the liquefaction process. This means that the drivers for the compressors or the power generation for the drivers are for the purpose of the present specification not considered as part of the liquefaction plant (or process) because they are not directly related to the liquefaction process. Heat exchangers, refrigerants, refrigerant compressors etc. are considered to be part of the liquefaction plant and process. The storage tanks, on the other hand, are not considered to be part of the liquefaction plant. Consequently, naturally occurring boil-off gas from a storage tank is not considered to be a stream generated in the liquefaction process. Preferably, storage is done at near atmospheric pressure, e.g. less than 1.5 bara (absolute).

For the purpose of the present specification, the term feed gas is used for a slipstream drawn from a hydrocarbon stream that has not yet undergone liquefaction but is to be liquefied. Hence, boil-off gas or a slipstream drawn from boil-off gas from the liquefied hydrocarbons is not considered to be a feed gas, since it evaporated out of a liquefied pool.

Thus, generating a stream for the hydrocarbon fuel stream may require merely drawing the stream from the liquefaction process, or be optionally followed by other process steps such as adjusting the pressure (e.g. by compressing or expanding) of the stream drawn from the liquefaction process.

FIG. 1 shows a general scheme 1 for a hydrocarbon liquefying process, generally involving cooling and liquefying a hydrocarbon stream such as natural gas.

In the course of such a process, a hydrocarbon stream, such as a natural gas stream, may be cooled by a method comprising at least the steps of:
(a) providing one or more hydrocarbon streams and one or more refrigerant streams, wherein the one or more refrigerant streams are in one or more refrigerant circuits, each refrigerant circuit comprising one or more compressors, one or more coolers, one or more expansion devices, and one or more heat exchangers;
(b) compressing at least a fraction of the one or more refrigerant streams in the one or more compressors to provide one or more compressed refrigerant streams;
(c) cooling the one or more compressed refrigerant streams in the one or more coolers to provide one or more cooled refrigerant streams;
(d) expanding at least a fraction of the one or more cooled refrigerant streams in the one or more expansion devices to provide one or more expanded refrigerant streams; and
(e) heat exchanging the one or more expanded refrigerant streams against the one or more hydrocarbon streams in the one or more heat exchangers to provide one or more refrigerant streams and one or more cooled hydrocarbon streams. At least one of the compressors may be driven with an electric driver which is powered by one or more dual-fuel diesel-electric generators fuelled by one or more hydrocarbon fuel streams generated in the liquefaction process.

The hydrocarbon feed stream may be any suitable gas stream to be cooled and liquefied, but is usually a natural gas stream obtained from natural gas or petroleum reservoirs. As an alternative the natural gas stream may also be obtained from another source, also including a synthetic source such as a Fischer-Tropsch process.

Usually a natural gas stream is comprised substantially of methane. Preferably the hydrocarbon feed stream comprises at least 50 mol % methane, more preferably at least 80 mol % methane.

Depending on the source, natural gas may contain varying amounts of hydrocarbons heavier than methane such as in particular ethane, propane and the butanes, and possibly lesser amounts of pentanes and aromatic hydrocarbons. The composition varies depending upon the type and location of the gas.

Conventionally, the hydrocarbons heavier than methane are removed as far as efficiently possible from the hydrocarbon feed stream prior to any significant cooling for several reasons, such as having different freezing or liquefaction temperatures that may cause them to block parts of a methane liquefaction plant.

The hydrocarbon feed stream may also contain non-hydrocarbons such as $H_2O$, $N_2$, $CO_2$, Hg, $H_2S$ and other sulphur compounds, and the like. If desired, the hydrocarbon feed stream comprising the natural gas may be pre-treated before cooling and liquefying. This pre-treatment may comprise reduction and/or removal of undesired components such as $CO_2$ and $H_2S$ or other steps such as early cooling, pre-pressurizing or the like. As these steps are well known to the person skilled in the art, their mechanisms are not further discussed here.

Thus, the term "hydrocarbon feed stream" also includes a composition prior to any treatment, such treatment including cleaning, dehydration and/or scrubbing, as well as any composition having been partly, substantially or wholly treated for the reduction and/or removal of one or more compounds or substances, including but not limited to sulphur, sulphur compounds, carbon dioxide, water, Hg, and one or more $C_2^+$ hydrocarbons.

The hydrocarbon feed stream is one example of a hydrocarbon fuel stream which can be used to fuel the DFDE generators in the method and apparatus described herein.

To provide a partially liquefied hydrocarbon stream, a hydrocarbon stream such as a hydrocarbon feed stream as hereinbefore described could be cooled. Such initial cooling could be provided by a number of methods known in the art. One example is by passing the hydrocarbon feed stream against a refrigerant, such as at least a first fraction of the mixed refrigerant of the mixed refrigerant circuit, in one or more first heat exchangers, to provide the partially liquefied hydrocarbon stream, preferably at a temperature below 0° C. A bleed stream from the refrigerant, provides a second example of a hydrocarbon fuel stream which can be used to fuel the DFDE generators in the method and apparatus described herein.

The mixed refrigerant circuit will comprise one or more refrigerant compressors to compress the mixed refrigerant stream. The refrigerant compressors preferably have an installed power of ≥15 MW, preferably ≥20 MW. These compressors can be driven by one or more electric drivers which can be powered by electricity from one or more dual-fuel diesel-electric generators.

Preferably, any such first heat exchangers could comprise a first cooling stage, and one or more second heat exchangers used in liquefying any fraction of the hydrocarbon stream could comprise one or more second or third cooling stages.

In this way, the method and apparatus disclosed herein may involve two or more cooling stages, each stage having one or more steps, parts etc. For example, each cooling stage may comprise one to five heat exchangers. The or a fraction of a hydrocarbon stream and/or the mixed refrigerant may not pass through all, and/or all the same, the heat exchangers of a cooling stage.

In one embodiment, the hydrocarbon liquefying process comprises two or three cooling stages. A first cooling stage is preferably intended to reduce the temperature of a hydrocarbon feed stream to below 0° C., usually in the range −20° C. to −70° C. Such a first cooling stage is sometimes also termed a 'pre-cooling' stage.

A second cooling stage is preferably separate from the first cooling stage. That is, the second cooling stage comprises one or more separate heat exchangers. Such a second cooling stage is sometimes also termed a 'main cooling' stage.

A second cooling stage is preferably intended to reduce the temperature of a hydrocarbon stream, usually at least a fraction of a hydrocarbon stream cooled by a first cooling stage, to below −100° C.

Heat exchangers for use as the one or more first or the one or more second heat exchangers are well known in the art. At least one of the second heat exchangers is preferably a spool-wound cryogenic heat exchanger known in the art. Optionally, a heat exchanger could comprise one or more cooling sections within its shell, and each cooling section could be considered as a cooling stage or as a separate 'heat exchanger' to the other cooling locations.

In yet another embodiment of the present invention, one or more fractions of the mixed refrigerant stream are passed through one or more heat exchangers, preferably two or more of the first and second heat exchangers described hereinabove, to provide one or more cooled mixed refrigerant streams.

The mixed refrigerant of the mixed refrigerant circuit may be formed from a mixture of two or more components selected from the group comprising: nitrogen, methane, ethane, ethylene, propane, propylene, butanes, pentanes, etc. The present invention may involve the use of one or more other refrigerants, in separate or overlapping refrigerant circuits or other cooling circuits.

In one embodiment of the present invention, the method of cooling, preferably liquefying a hydrocarbon stream comprises one refrigerant circuit comprising one mixed refrigerant.

A mixed refrigerant or a mixed refrigerant stream as referred to herein comprises at least 5 mol % of two different components. A common composition for a mixed refrigerant can be:

| | |
|---|---|
| Nitrogen | 0-10 mol % |
| Methane ($C_1$) | 30-70 mol % |
| Ethane ($C_2$) | 30-70 mol % |
| Propane ($C_3$) | 0-30 mol % |
| Butanes ($C_4$) | 0-15 mol % |

The total composition comprises 100 mol %.

It is apparent that such a mixed refrigerant composition is suitable as a hydrocarbon fuel stream. A bleed stream from the mixed refrigerant can be used as one hydrocarbon fuel stream for the dual-fuel diesel-electric generator. For instance, a mixed refrigerant bleed stream can be drawn from one or more of the first or one or more of the second heat exchangers and passed to the hydrocarbon fuel stream.

It is known that the composition and inventory of a mixed refrigerant may be varied by a liquefaction plant user depending upon the geographical location of the liquefaction plant, one factor being the expected daily or weekly average ambient temperature, and another factor being seasonal adjustment to take account of variation in ambient temperature over a year. A refrigerant stream may also need replenishment due to leakage.

Separate supply of the mixed refrigerant components is conventionally provided in the art by the location of a number of storage tanks nearby to the hydrocarbon liquefying process, each storage tank storing one separated component such as ethane, propane, etc, which can supply its component to the mixed refrigerant on demand.

The term "inventory" as used herein relates to both the amount (in mass or volume) of all the components, and to the percentage or proportion (as a ratio or %) of each component, in the mixed refrigerant circuit.

In another embodiment, the method is for liquefying natural gas to provide liquefied natural gas.

Preferably, the liquefied hydrocarbon stream provided by the present invention is stored in one or more storage tanks, which storage tanks may be also located on any floating vessel or off-shore platforms.

Further, the person skilled in the art will readily understand that after liquefaction, the liquefied hydrocarbon stream may be further processed, if desired. As an example, the obtained LNG may be depressurized by means of a Joule-Thomson valve or by means of a cryogenic turbo-expander.

In another embodiment of the present invention, the liquefied hydrocarbon stream is passed through an end gas/liquid separator such as an end-flash vessel to provide an end-flash gas stream overhead and a liquid bottom stream, optionally for storage in a storage tank as the liquefied product such as LNG.

The end-flash gas stream provides a third example of a suitable hydrocarbon fuel stream for the DFDE generator.

The liquefied hydrocarbon stream may be depressurized to the fuel gas pressure selected for operating the one or more dual-fuel diesel-electric generators, which is preferably also the pressure at which one or more hydrocarbon fuel streams are passed to the one or more dual-fuel diesel-electric generators. This way, the overhead end-flash gas stream does not need further compression to fuel gas pressure. In such an embodiment, the liquid bottom stream may be further depressurized before passing to storage.

Alternatively, the end-flash gas can be compressed in an end compressor driven by an end electric driver and provided to the dual-fuel diesel-electric generator. The electricity provided by the DFDE generator can by used to power the end electric driver for the end compressor.

Where a fraction, preferably the coldest fraction, of the refrigerant stream passes through a suitable gas/liquid separator, at least a fraction of the gaseous overhead stream from this gas/liquid separator could be combined with the gaseous overhead stream from the end gas/liquid separator, and optionally boil-off gas from the storage tank, to provide a combined stream for compression and use as fuel gas for the DFDE generator.

The present invention is particularly suitable for location on a floating vessel, an off-shore platform or a caisson. A floating vessel may be any movable or moored vessel, generally at least having a hull, and usually being in the form of a ship such as a 'tanker'.

Such floating vessels can be of any dimensions, but are usually elongate. Whilst the dimensions of a floating vessel are not limited at sea, building and maintenance facilities for floating vessels may limit such dimensions. Thus, in one embodiment of the present invention, the floating vessel or off-shore platform is less than 600 m long such as 500 m, and a beam of less than 100 m, such as 80 m, so as to be able to be accommodated in existing ship-building and maintenance facilities.

An off-shore platform may also be movable, but is generally more-permanently locatable than a floating vessel. An off-shore platform may also float, and may also have any suitable dimensions.

The present invention may provide a nominal capacity (or name plate) of a liquefied hydrocarbon stream in the range of less than 2 million (metric) tonnes per annum (MTPA). The term "nominal capacity" is defined at the daily production capacity of a plant multiplied by the number of days per years the plant is intended to be in operation. For instance, some LNG plants are intended to be operational for an average of 345 days per year. Preferably the nominal capacity of the hydrocarbon cooling process of the present invention is in the range of 1 to <2 MTPA.

Referring to the drawings, FIG. 1 shows a general scheme 1 for a hydrocarbon liquefying process. As part of a hydrocarbon liquefying process, and prior to any major cooling, an initial hydrocarbon stream containing natural gas is conventionally pre-treated to reduce and/or remove as much of the heavier hydrocarbons therefrom. A common form of such separation is termed 'natural gas liquids'(NGL) extraction, in which proportions of $C_2^+$ hydrocarbons are fractionated to provide a methane-enriched stream which is subsequently cooled, and one or more single or multi-component streams for the $C_2^+$ components, such as NGL and LPG product streams.

After any pre-treatment and pre-fractionation, processes, steps or stages, optionally carried out remotely, the initial hydrocarbon stream is provided as a hydrocarbon feed stream 10 as shown in FIG. 1. FIG. 1 shows one embodiment having an apparatus for cooling a hydrocarbon stream 10, 20 at least comprising:

one or more refrigerant circuits 4, each refrigerant circuit comprising one or more compressors 32, 34, one or more coolers 26, 28, one or more expansion devices 126, 136, 156, and one or more heat exchangers 12, 22, said heat exchangers providing one or more cooled hydrocarbon streams 20, 50, and at least one refrigerant bleed stream 40, and at least one of said heat exchangers cooling a hydrocarbon feed stream 10;

each said compressors 32, 34 coupled to an electric driver D1, D2, which is provided with electricity generated by one or more dual-fuel diesel-electric generators 300;

an end gas/liquid separator to provide an end-flash gas stream 60 from a cooled hydrocarbon stream 50; and said dual-fuel diesel-electric generators 300 fuelled by one or more hydrocarbon fuel streams 96, 98. In the embodiment as shown in FIG. 1, the hydrocarbon fuel stream 98 is supplied by one or more streams selected from the group comprising: the refrigerant bleed stream 40, the end-flash gas stream 60 and a feed stream 11 from the hydrocarbon feed stream 10.

The operation of the apparatus will now be discussed in greater detail referring to FIG. 1. The hydrocarbon feed stream 10 passes through one or more heat exchangers 12 which can also define a first cooling stage. Preferably, the first cooling stage cools the hydrocarbon feed stream 10 to below 0° C., such as between −20° C. and −70° C., preferably either between −20° C. and −45° C., or between −40° C. and −70° C., to provide a partially liquefied hydrocarbon stream 20. A portion of the hydrocarbon feed stream 10 may be removed as hydrocarbon feed gas stream 11 and used as fuel gas for the DFDE generator 300. This is discussed in greater detail below.

Cooling in the one or more first heat exchangers 12 is provided by a mixed refrigerant 100. A compressor feed stream 140 comprising at fully evaporated mixed refrigerant is compressed by a first compressor 32 driven by a first electric driver D1 to provide a first compressed refrigerant stream 142. The first electric driver D1 can be powered by electricity from the DFDE generator 300.

The first compressed refrigerant stream 142 can be cooled by a first cooler 26 to provide a first cooled compressed stream 169, and then combined with first refrigerant stream 160 from the first heat exchanger 12 to provide a combined compressor stream 170 for second compressor 34. Second compressor 34 can be driven by second electric driver D2 to provide second compressed refrigerant stream 171. Second electric driver D2 can be powered by electricity from the DFDE generator 300. Second compressed refrigerant stream 171 is passed through second cooler 28 to provide first cooled refrigerant stream 101.

First cooled refrigerant stream 101 can pass through a first refrigerant gas/liquid separator E to provide an overhead gaseous stream 102 and a liquid bottom stream 103. The overhead gaseous stream 102 is passed through first heat exchanger 12 and cooled to provide second refrigerant stream 110. The liquid bottom stream 103 may be cooled by its passage through the first heat exchanger (not shown) to provide a first fraction cooled refrigerant stream 150, which can be expanded through an expansion device, such as valve 156 to produce first fraction 154 of mixed refrigerant 100 and passed into first heat exchanger 12 where it is at least partially evaporated as an outgoing first refrigerant stream 160 in a manner known in the art.

The partially liquefied hydrocarbon stream 20 in FIG. 1 passes to one or more second heat exchangers 22, preferably a main cryogenic heat exchanger. After passage through the second heat exchanger 22, there is provided a liquefied hydrocarbon stream 50.

Cooling in the one or more second heat exchangers 22 is provided by an incoming second refrigerant stream 110 comprising at least a fraction of the mixed refrigerant of the mixed refrigerant circuit 4. The second refrigerant stream 110 is evaporated through the one or more second heat exchangers 22 to provide compressor feed stream 140 in a manner known in the art.

Liquefied hydrocarbon stream 50 is then passed through an expansion device such as a valve 53 to provide an expanded partially liquefied hydrocarbon stream 54 which is passed to an end gas/liquid separator J, which can be an end-flash vessel. The end gas/liquid separator J provides an end-flash gas stream 60 overhead and a liquid bottom stream 70. The liquid bottom stream 70 can be passed into a storage tank 42, such as an LNG storage tank 42.

End-flash gas stream 60 can be optionally combined with one or both of the mixed refrigerant bleed stream 40, preferably in the form of a mixed refrigerant bleed gas stream, and the boil-off gas stream 75 from storage tank 42, prior to passing it to one or more end compressors 36, which are driven by end electric drivers D3. The end electric drivers D3 can be powered by electricity from the DFDE generator 300. End compressors 36 provide fuel stream 90. A portion of fuel stream 90 can be removed as recycle hydrocarbon stream 43, cooled by recycle cooler 44 to provide a liquefied recycle stream 45 and returned to storage tank 42.

Fuel stream 90 can optionally be combined with hydrocarbon feed gas stream 11 to provide a hydrocarbon fuel stream 96 and passed to dual-fuel diesel-electric generator 300 to generate electrical power for first, second and end electric drivers D1, D2 and D3 respectively. The hydrocarbon feed gas stream 11 that is fed into line 90 can be used to control the pressure of hydrocarbon fuel gas stream 96, in order to provide fuel gas at a stable and suitable operating pressure for DFDE generator 300, for instance a pressure of about 5 bar. A feed to fuel let down valve 97 is provided for this purpose. A feed to fuel flowrate in line 11 may typically be about 10% or less of the total fuel demand. A supplementary fuel stream 98, such as a heavy oil or a marine diesel oil stream may also be provided to DFDE generator 300.

Figure 2:
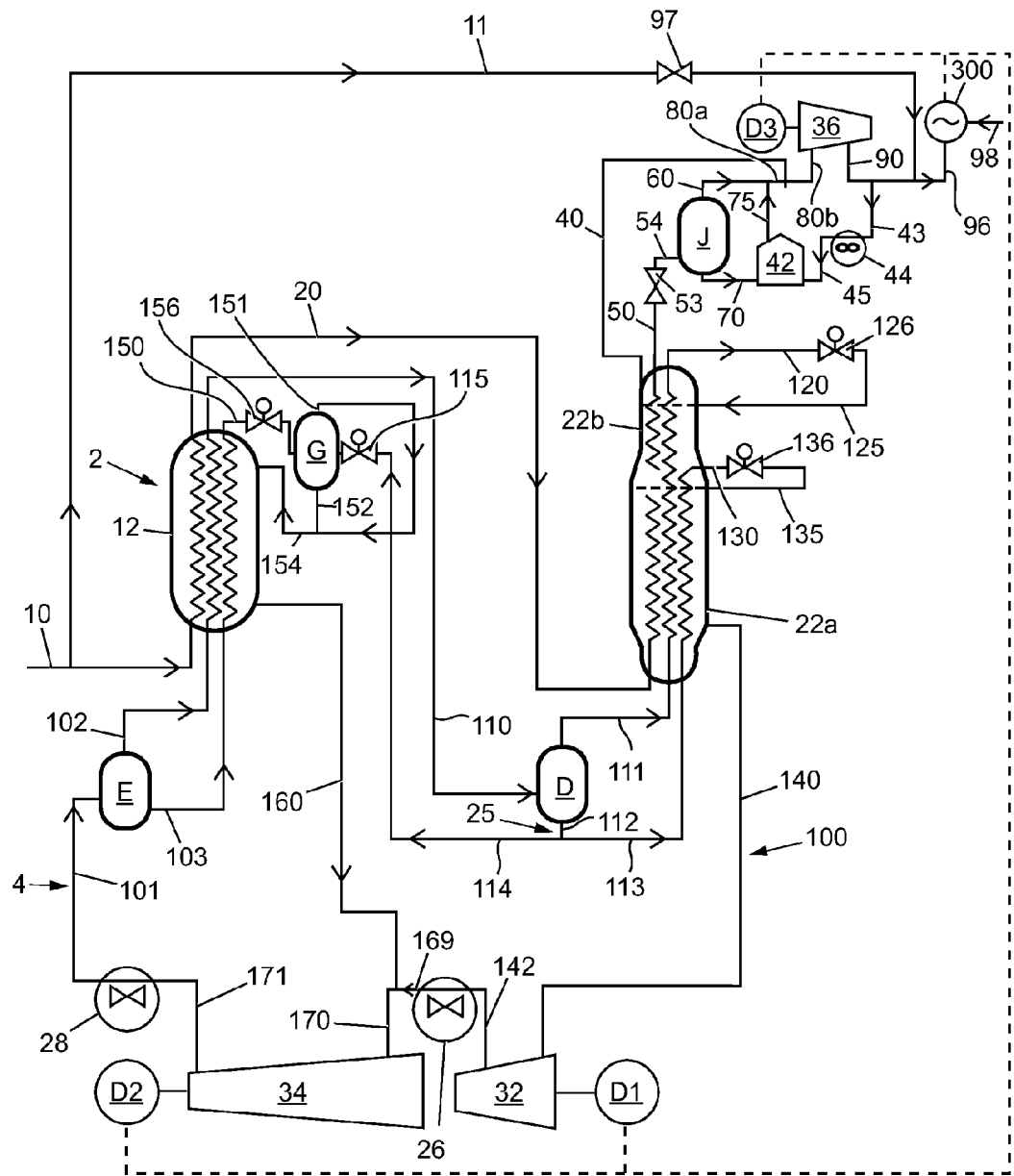
FIG. 2 is a more detailed scheme of FIG. 1 showing various embodiments of the present invention.

In a further embodiment, exemplified in FIG. 2, a method of cooling a hydrocarbon stream 10, 20, such as a natural gas stream is disclosed. The method comprises at least the steps of:

(a) providing one or more hydrocarbon streams 10, 20 and one or more refrigerant streams 100, wherein the one or more refrigerant streams 100 are in one or more refrigerant circuits 4, each refrigerant circuit 4 comprising one or more compressors 32, 34, one or more coolers 26, 28, one or more expansion devices 126, 136, 156, and one or more heat exchangers 12, 22;

(b) compressing at least a fraction 140, 170 of the one or more refrigerant streams 100 in the one or more compressors 32, 34 to provide one or more compressed refrigerant streams 142, 171;

(c) cooling the one or more compressed refrigerant streams 142, 171 in the one or more coolers 26, 28 to provide one or more cooled refrigerant streams 101, 169;

(d) expanding at least a fraction 120, 130, 150 of the one or more cooled refrigerant streams 101, 169 in the one or more expansion devices 126, 136, 156 to provide one or more expanded refrigerant streams 125, 135, 154; and (e) heat exchanging the one or more expanded refrigerant streams 125, 135, 154 against the one or more hydrocarbon streams 10, 20 in the one or more heat exchangers 12, 22 to provide one or more refrigerant streams 100 and one or more cooled hydrocarbon streams 20, 50.

At least one of the compressors 32, 34 may be operated by the method disclosed herein.

It is preferred that the refrigerant circuit 4 is a mixed refrigerant circuit 4 and the refrigerant stream 100 is a mixed refrigerant stream 100. More preferably, the mixed refrigerant stream 100 comprises two or more of the group comprising: nitrogen, methane, ethane, ethylene, propane, propylene, butanes and pentanes.

It is further preferred that: the one or more heat exchangers 12, 22 may comprise one or more first heat exchangers 12 in a first cooling stage, the one or more refrigerant streams 100 comprise a first fraction cooled refrigerant 150, the one or more hydrocarbon streams 10, 20 comprise a hydrocarbon feed stream 10 and the one or more cooled hydrocarbon streams 20, 50 may comprise a partially liquefied hydrocarbon stream 20.

It is further preferred that: the one or more heat exchangers 12, 22 comprise one or more second heat exchangers 22 in a second cooling stage, the one or more refrigerant streams 100 comprise one or more second fraction mixed refrigerant streams 120, 130, the one or more hydrocarbon streams 10, 20 comprise a partially liquefied hydrocarbon stream 20 and the one or more cooled hydrocarbon streams 20, 50 comprise a liquefied hydrocarbon stream 50.

The method of cooling the hydrocarbon stream may further comprise the steps of:
(f) passing the liquefied hydrocarbon stream 50 through an expansion device 53 to provide an expanded partially liquefied hydrocarbon stream 54;
(g) separating the expanded partially liquefied hydrocarbon stream 54 in an end gas/liquid separator J into an end-flash gas stream 60 and a liquid bottom stream 70; and
(h) passing the liquid bottom stream 70 into a storage tank 42.

The method of cooling the hydrocarbon stream may further comprise the steps of:
(i) passing the end-flash gas stream 60 to one or more end compressors 36 to provide a fuel stream 90; and
(j) passing the fuel stream 90 to the one or more duel-fuel diesel-electric generators 300 as a hydrocarbon fuel stream 96.

The method of cooling the hydrocarbon stream may still further comprise the steps of:
(k) drawing a boil-off gas stream 75 from the storage tank 42;
(l) passing the boil-off gas stream 75 to one or more end compressors 36 to provide a fuel stream 90; and
(m) passing the fuel stream 90 to the one or more duel-fuel diesel-electric generators 300 as a hydrocarbon fuel stream 96.

It is preferred that the method of cooling the hydrocarbon stream is carried out in a single train with a production capacity of <2 MTPA. More preferably, the single train has a single driver of 80 MW.

The method of this embodiment may preferably be carried out on a floating structure 52, caisson or an off-shore platform. Such a floating structure, caisson or off-shore platform may further comprise a propulsion system.

FIG. 2 provides a more detailed scheme 2 of a hydrocarbon liquefying process such as the general scheme 1 shown in FIG. 1. As with FIG. 1, there is provided a hydrocarbon feed stream 10 which may have been pre-treated to reduce and/or remove at least some of the non-hydrocarbons in an initial feed stream such as natural gas, and optionally some of the hydrocarbons heavier than methane as discussed hereinabove. A portion of hydrocarbon feed stream 10 may be removed as hydrocarbon feed gas stream 11, and combined with further combined stream 80*a* to provide triple combined stream 80*b*.

The hydrocarbon feed stream 10 passes through a first heat exchanger 12, which may comprise one or more heat exchangers in series, parallel, or both, in a manner known in the art to provide a partially liquefied hydrocarbon stream 20.

The cooling in the first heat exchanger 12 is provided by a first fraction 154 of the mixed refrigerant 100. In the scheme 2 shown in FIG. 2, the first fraction 154 is shown passing into the top or upper part of the first heat exchanger 12. The provision of the first fraction 154 is described herein below. After providing its cooling in the first heat exchanger 12, the first fraction 154 becomes an at least partly evaporated, usually fully evaporated, mixed refrigerant stream 160 which can pass through a refrigerant gas/liquid separator, such as a knock-out drum (not shown) and be combined with first cooled compressed stream 169.

The second heat exchanger 22 has two sections, a lower section, and an upper section. These are shown in FIG. 2 as a lower second heat exchanger 22*a* and an upper second heat exchanger 22*b*. The arrangement of two or more heat exchangers as sections in a, for example cryogenic, heat exchanger are known in the art, and are not further discussed herein.

After the partially liquefied hydrocarbon stream 20 is passed through the second heat exchangers 22*a*, 22*b*, there is provided a liquefied hydrocarbon stream 50.

Cooling of the partially liquefied stream 20 in the second heat exchangers 22*a*, 22*b* is provided by two fractions 125, 135 of the mixed refrigerant 100, which fractions enter the second heat exchanger 22 at different locations, so as to provide the different heat-exchanging sections within the second heat exchanger 22 in a manner known in the art. At or near the base of the first second heat exchanger 22*a*, the mixed refrigerant after its use can be collected as an at least partly, usually fully, evaporated mixed refrigerant stream 140, which can pass through a refrigerant gas/liquid separator, such as a knock-out drum (not shown) and on to first compressor 32.

The mixed refrigerant stream 140 is compressed by first compressor 32 to provide a first compressed stream 142, cooled by a first cooler 26, and then combined with the gaseous stream 160 to provide a combined compressor stream 170 for a second compressor 34. The second compressor 34 provides a second compressed refrigerant stream 171 which passes through a second cooler 28 to provide a mixed refrigerant stream 101 ready for reuse.

The mixed refrigerant stream 101 can pass through a first refrigerant gas/liquid separator E to provide an overhead gaseous stream 102 and a liquid bottom stream 103.

The gaseous overhead stream 102 and liquid bottom stream 103 pass through the first heat exchanger 12. Where there are more than two first heat exchangers 12, such as 3, 4 or 5 heat exchangers, one or more of the hydrocarbon stream 10, the gaseous overhead stream 102 and the liquid bottom stream 103, may not pass through all of the first heat exchangers 12, but may be selected to pass through certain of the first heat exchangers 12 to provide a particular arrangement of cooling to the three streams in a manner known in the art.

The liquid bottom stream 103 is cooled by its passage through the first heat exchanger 12 to provide a cooled stream 150, which is a first fraction cooled refrigerant stream, which can be expanded through an expansion device such as a valve 156 and passed into another refrigerant gas/liquid separator G, which provides an overhead gaseous stream 151 and a liquid bottom stream 152. Overhead gaseous stream 151 can be combined with liquid bottom stream 152 and passes back into the first heat exchanger 12 as stream 154 to provide cooling as described hereinabove.

The overhead gaseous stream 102 from the first refrigerant gas/liquid separator E is also cooled by the first heat exchanger 12 to provide a cooled refrigerant stream 110, which then passes through another refrigerant gas/liquid separator D to provide an overhead gaseous stream 111 and a liquid bottom stream 112. Typically, the liquid bottom stream 112 has a greater proportion of heavier hydrocarbons, and is also typically termed a heavy mixed refrigerant stream (HMR). By means of a suitable divider 25, the liquid bottom stream 112 can be arranged to provide between 0-100% of one or two further streams, these being a first cooling stage return stream 114 (to pass to the refrigerant gas/liquid separator G after passing through valve 115) and a second cooling stage cooling stream 113 for use in the first second heat exchanger 22a.

The overhead gaseous stream 111 from the second refrigerant gas/liquid separator D, commonly also termed a light mixed refrigerant stream (LMR), passes through the second heat exchanger 22 to provide a cooled refrigerant stream 120, which is a second fraction cooled refrigerant stream, which passes through an expansion device, such as valve 126 to provide a fraction 125 of the mixed refrigerant 100 for cooling in the second upper heat exchanger 22b in a manner known in the art. A mixed refrigerant bleed stream 40, in the form of a mixed refrigerant bleed gas stream, can be removed from the upper second heat exchanger 22b, preferably the shell-side, and combined with further combined stream 80a, to provide triple combined stream 80b, which can be compressed in end compressor 36 to provide fuel gas stream 90 for the DFDE generator 300.

Similarly, the cooling stream 113, being at least a fraction of the liquid bottom stream 112 from the second refrigerant gas/liquid separator D, is also cooled by passage through the lower second heat exchanger 22a to provide a cooled refrigerant stream 130, which is a second fraction mixed refrigerant stream, which is expanded by passage through an expansion device, such as valve 136 to provide a fraction 135 for re-entry into the lower second heat exchanger 22a and cooling in a common or separate section of the second heat exchanger 22 in a manner known in the art.

The scheme 2 shows use of a single mixed refrigerant circuit 4, although the present invention is not limited thereto. The use of single mixed refrigerant circuits to provide cooling to two or more different sets of heat exchangers is known in the art, and an example is shown in WO 96/33379 A1 incorporated herein by way of reference. Alternatively, the scheme 2 may involve one or more other, further or separate refrigerant circuits to provide other, further or separate cooling to one or more of the streams. The present invention is not limited by the nature of arrangement of the refrigerant circuit or circuits.

Figure 3:
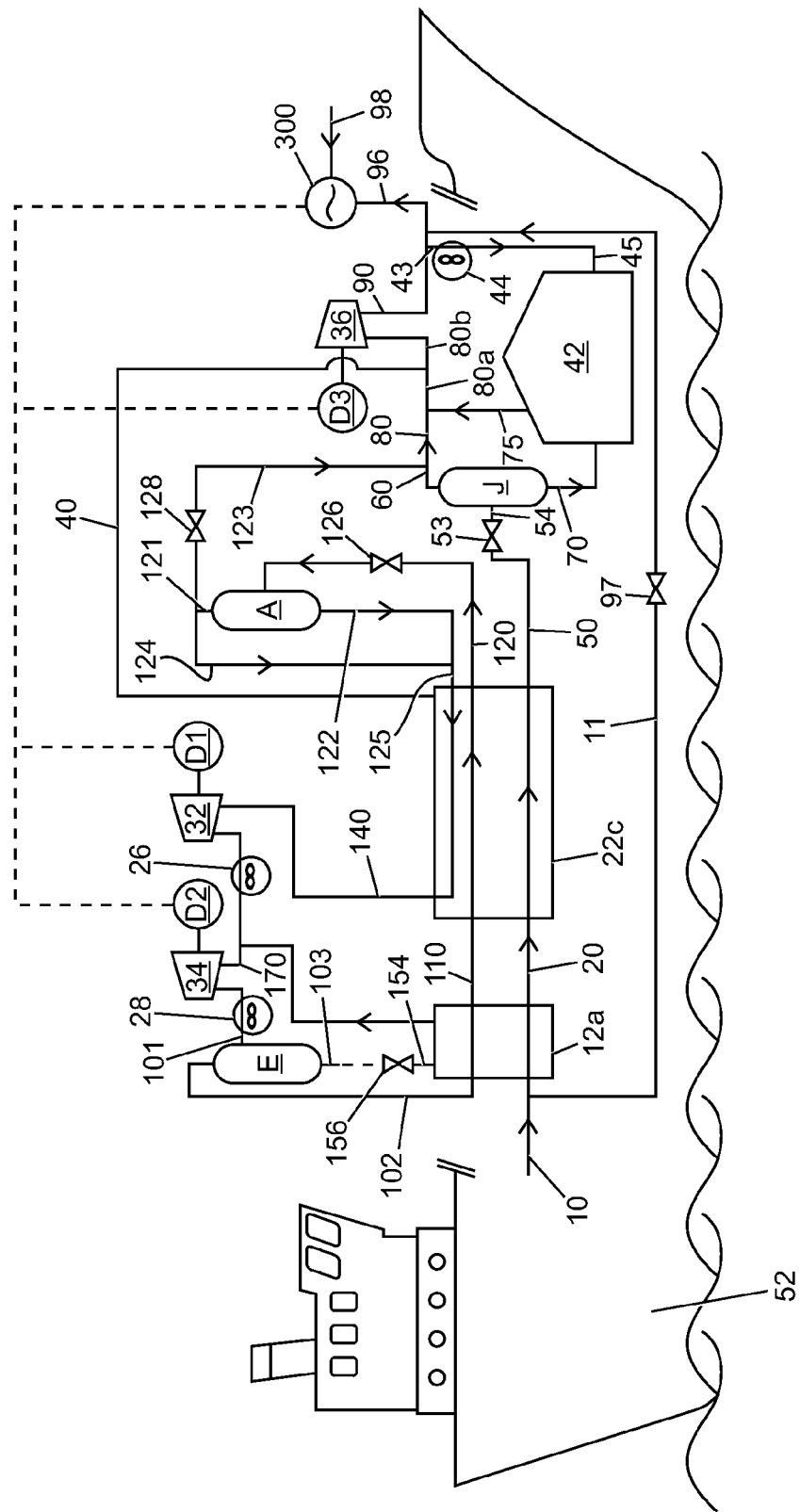
FIG. 3 is a diagrammatic floating vessel showing another embodiment of the present invention.

FIG. 3 shows a floating vessel 52 such as a tanker, including a hydrocarbon liquefying process based on scheme 2 shown in FIG. 2. In FIG. 3, a hydrocarbon feed stream 10 passes through a first cooling stage 12a having one or more first heat exchanger(s) 12 such as shown in FIG. 2, to provide a partially liquefied hydrocarbon stream 20, which passes through a second cooling stage 22c involving one or more second heat exchangers to provide a liquefied hydrocarbon stream 50. The liquefied hydrocarbon stream 50 passes into an end gas/liquid separator J via an expansion device, such as a valve 53, to provide an end-flash gas stream 60 overhead, and a liquid bottom stream 70 which passes into a storage tank 42 such as an LNG storage tank 42.

FIG. 3 also shows a cooled refrigerant stream 120 similar to the second fraction cooled refrigerant stream 120 in FIG. 2, from the second cooling stage 22c, which passes into a refrigerant gas/liquid separator A. The gas/liquid separator A provides an overhead gaseous stream 121, a fraction of which passes through a valve 128 to provide a gaseous stream 123 which can be combined with the end-flash gas stream 60 from the end gas/liquid separator J to provide a combined stream 80. To the combined stream 80 could be added any boil-off gas from the storage tank 42 passing along line 75 to create a further combined stream 80a. To further combined stream 80a can be added mixed refrigerant bleed stream 40 drawn from second heat exchanger 22c to provide triple combined stream 80b which can be compressed and subsequently used as a fuel stream 90. Optionally, hydrocarbon feed gas stream 11 can be combined with fuel stream 90 to provide a hydrocarbon fuel stream 96 which is passed to DFDE generator 300.

Figure 4:
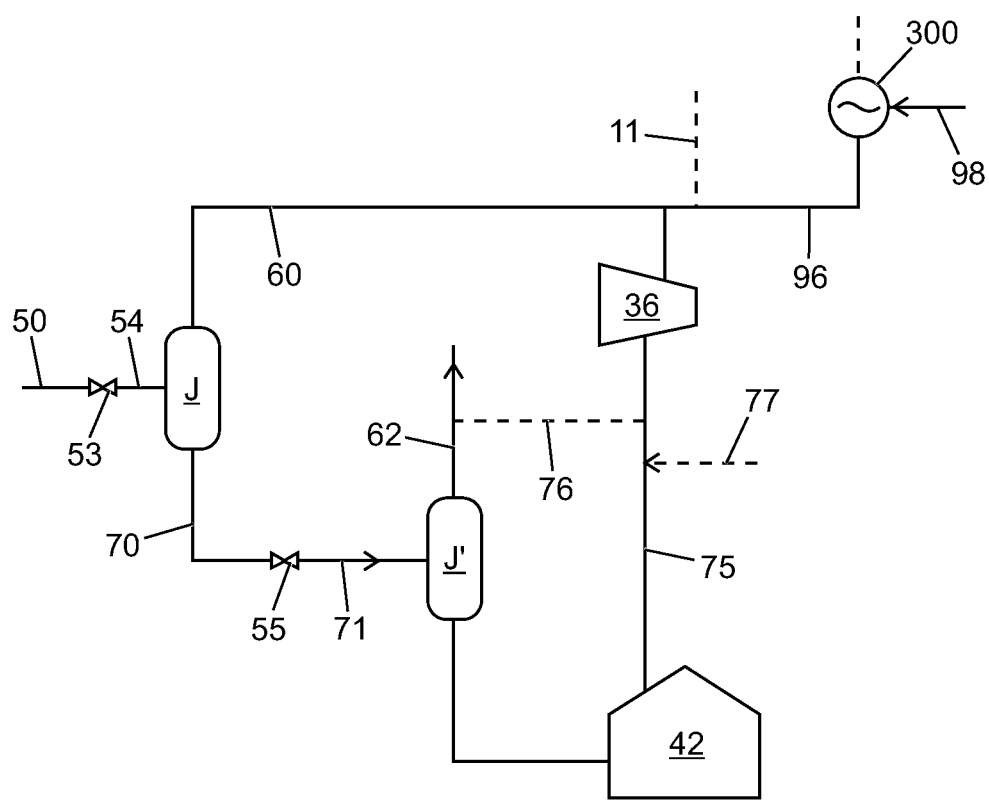
FIG. 4 shows a schematic alternative end-flash process suitable for the present invention.

Turning now to FIG. 4, there is shown an alternative end flash scheme for the liquefaction process as described hereinabove. In this alternative scheme, the liquefied hydrocarbon stream 50 is depressurized in two stages. In the first stage the liquefied hydrocarbon stream 50 is passed through an expansion device such as a valve 53, a (dynamic) expander, or a combination of both, to provide the expanded partially liquefied hydrocarbon stream 54 which is passed to end gas/liquid separator J as before. However, in this alternative scheme, the pressure in the gas/liquid separator J may be selected to match the fuel gas pressure selected for operating the one or more dual-fuel diesel electric generators 300. Thus, in the first stage the liquefied hydrocarbon stream 50 may be depressurized to fuel gas pressure. This may be a higher pressure than storage pressure, typically in a range of from 3 to 10 bara, preferably in a range of from 3 to 9 bara. The liquid bottom stream 70 may then be further depressurized, in a further expansion device 55, to storage pressure, typically near atmospheric and smaller than 1.5 bara (absolute). The further expansion device may be provided in the form of a valve or expander, the valve being preferred. The resulting further depressurized stream 71 may be passed to an auxiliary end gas/liquid separator J' for separating into the liquid product stream 72 that may be passed into the storage tank 42, and an auxiliary end flash overhead stream 62.

There are various options for handling the auxiliary end flash overhead stream 62. One is pass it to one or more end compressors 36 as described herein above. One way to achieve this is to add the auxiliary end flash overhead stream 62 to the boil-off gas stream 75 from storage tank 42, for instance via optional line 76. In this case, a boil-off gas compressor may be used instead of the end compressor 36.

Optionally, one or more other hydrocarbon containing gas streams may be added to the boil-off gas stream 75, as schematically indicated at line 77, such as for instance a refrigerant bleed stream. Likewise optionally, one or more other hydrocarbon containing gas stream may be added to the hydrocarbon fuel gas stream 96 at fuel gas pressure, such as for instance a portion 11 derived from the feed gas.

The presently disclosed methods and apparatuses allow for operating a compressor in a facility for cooling a hydrocarbon stream in a way that does not require the use of direct-drive gas turbines. This dispenses with the presence of fired turbines on deck amongst the other liquefaction equipment. Such fired turbines can pose safety problems, particularly on floating structures.

The person skilled in the art will understand that the present invention can be carried out in many various ways without departing from the scope of the appended claims.

I claim:

1. A method of cooling and liquefying a hydrocarbon stream comprising at least the steps of:
   (i) providing one or more compressors;
   (ii) driving the one or more compressors with one or more electric drivers;
   (iii) powering the one or more electric drivers with one or more dual-fuel diesel-electric generators;
   (iv) passing one or more hydrocarbon fuel streams to the one or more dual-fuel diesel-electric generators; and
   (v) operating a liquefaction process comprising providing a hydrocarbon stream, and cooling and at least partially liquefying the hydrocarbon stream to obtain a liquefied hydrocarbon stream;
   wherein at least one of the one or more hydrocarbon fuel streams comprises a stream that is generated in the liquefaction process.

2. The method according to claim 1, wherein hydrocarbon stream provided in step (v) is a pressurized hydrocarbon stream, and wherein the liquefaction process further comprises:
   (vi) depressurizing the liquefied hydrocarbon stream to provide an expanded partially liquefied hydrocarbon stream;
   (vii) passing the expanded partially liquefied hydrocarbon stream through an end gas/liquid separator thereby providing an end-flash gas stream overhead and a liquid bottom stream;
   (viii) passing the liquid bottom stream into a storage tank; and
   wherein the stream that is generated in the liquefaction process comprises said end-flash gas stream.

3. The method according to claim 2, wherein in step (iv) the one or more hydrocarbon fuel streams are passed to the one or more dual-fuel diesel-electric generators at a fuel gas pressure selected for operating the one or more dual-fuel diesel-electric generators, and wherein in step (vi) the liquefied hydrocarbon stream is depressurized to fuel gas pressure.

4. The method according to claim 3, wherein said passing the liquid bottom stream into said storage tank comprises further depressurizing the liquid bottom stream to storage pressure.

5. The method according to claim 1 wherein said cooling and at least partially liquefying in step (v) comprises heat exchanging the hydrocarbon stream against a refrigerant stream.

6. The method according to claim 5, wherein at least one of the one or more compressors is a refrigerant compressor.

7. The method according to claim 6, wherein heat said heat exchanging against said refrigerant stream comprises at least the steps of:
   (a) providing at least one refrigerant stream, wherein the at least one refrigerant streams is in a refrigerant circuit, the refrigerant circuit comprising the refrigerant compressor, one or more coolers, one or more expansion devices, and one or more heat exchangers;
   (b) compressing at least a fraction of the at least one refrigerant stream in the refrigerant compressor to provide a compressed refrigerant stream;
   (c) cooling the compressed refrigerant stream in the one or more coolers to provide a cooled refrigerant stream;
   (d) expanding at least a fraction of the cooled refrigerant stream in the one or more expansion devices to provide an expanded refrigerant stream; and
   (e) heat exchanging the expanded refrigerant stream against the hydrocarbon stream in the one or more heat exchangers to provide the at least one refrigerant stream and the cooled hydrocarbon stream.

8. The method according to claim 1 wherein the stream that is generated in the liquefaction process comprises refrigerant bleed gas.

9. The method according to claim 1, further comprising drawing a feed gas stream from the hydrocarbon stream, and wherein at least one of the one or more hydrocarbon fuel streams comprises the feed gas stream.

10. The method according to claim 9, wherein the hydrocarbon stream is a pressurized hydrocarbon stream and wherein the pressure of the at least one of the one or more hydrocarbon fuel streams is controlled by the relative amount of feed gas stream in the hydrocarbon fuel stream.

11. The method as claimed in claim 1 wherein the one or more hydrocarbon fuel streams further comprise a supplementary fuel stream comprising one or more of the group selected from: heavy fuel oil and marine diesel oil.

12. An apparatus for cooling and liquefying a hydrocarbon stream at least comprising:
   at least one compressor;
   an electric driver coupled with the least one compressor;
   one or more dual-fuel diesel-electric generators arranged to provide electric power to the one or more electric drivers, said one or more dual-fuel diesel-electric generators being operable using one or more hydrocarbon fuel streams; and
   a liquefaction plant comprising: a source for providing a hydrocarbon stream;
   one or more heat exchangers for cooling and at least partially liquefying the hydrocarbon stream to obtain a liquefied hydrocarbon stream;
   wherein at least one of the one or more hydrocarbon fuel streams comprises a stream generated in the liquefaction plant.

13. The apparatus according to claim 12, wherein the liquefaction plant further comprises:
   an expansion device for depressurizing the liquefied hydrocarbon stream to provide an expanded partially liquefied hydrocarbon stream;
   an end gas/liquid separator arranged to receive the expanded partially liquefied hydrocarbon stream and to separate the expanded partially liquefied hydrocarbon stream into an end-flash gas stream overhead and a liquid bottom stream;
   means for passing the liquid bottom stream into a storage tank;
   wherein the stream generated in the liquefaction plant comprises said end-flash gas stream.

14. The apparatus according to claim 13, wherein said means for passing the liquid bottom stream into said storage tank comprises a further expansion device for further depressurizing the liquid bottom stream to storage pressure.

15. The apparatus according to claim 12 wherein the at least one compressor is a refrigerant compressor, the liquefaction plant further comprising:
   at least one refrigerant circuit comprising the refrigerant compressor, one or more coolers, one or more expansion devices, and one or more of the one or more heat exchangers.

16. A floating structure, caisson or off-shore platform, comprising an apparatus for cooling and liquefying a hydrocarbon stream, said apparatus at least comprising:
- at least one compressor;
- an electric driver coupled with the least one compressor;
- one or more dual-fuel diesel-electric generators arranged to provide electric power to the one or more electric drivers, said one or more dual-fuel diesel-electric generators being operable using one or more hydrocarbon fuel streams; and
- a liquefaction plant comprising:
- a source for providing a hydrocarbon stream;
- one or more heat exchangers for cooling and at least partially liquefying, the hydrocarbon stream to obtain a liquefied hydrocarbon stream;
- wherein at least one of the one or more hydrocarbon fuel streams comprises a stream generated in the liquefaction plant.

17. The floating structure, caisson or off-shore platform according to claim 16, wherein the liquefaction plant further comprises:
- an expansion device for depressurizing the liquefied hydrocarbon stream to provide an expanded partially liquefied hydrocarbon stream;
- an end gas/liquid separator arranged to receive the expanded partially liquefied hydrocarbon stream and to separate the expanded partially liquefied hydrocarbon stream into an end-flash gas stream overhead and a liquid bottom stream;
- means for passing the liquid bottom stream into a storage tank; wherein the stream generated in the liquefaction plant comprises said end-flash gas stream.

18. The floating structure, caisson or off-shore platform according to claim 17, wherein said means for passing the liquid bottom stream into said storage tank comprises a further expansion device for further depressurizing the liquid bottom stream to storage pressure.

19. The floating structure, caisson or off-shore platform according to claim 16, wherein the at least one compressor is a refrigerant compressor, the liquefaction plant further comprising:
- at least one refrigerant circuit comprising the refrigerant compressor, one or more coolers, one or more expansion devices, and one or more of the one or more heat exchangers.

* * * * *